US012559436B2

(12) United States Patent
Swisher et al.

(10) Patent No.: US 12,559,436 B2
(45) Date of Patent: Feb. 24, 2026

(54) AGGLOMERATED DISPERSIBLE GRANULES, METHODS FOR AMENDING SOIL, AND ACTIVATED ALUMINA SUSPENSIONS

(71) Applicant: PHOSPHOLUTIONS INC., State College, PA (US)

(72) Inventors: Hunter R. Swisher, St. Petersburg, FL (US); Aaron Waltz, Rockford, IL (US)

(73) Assignee: PHOSPHOLUTIONS INC., State College, PA (US)

( * ) Notice: Subject to any disclaimer, the term of this patent is extended or adjusted under 35 U.S.C. 154(b) by 700 days.

(21) Appl. No.: 17/906,022

(22) PCT Filed: Mar. 9, 2021

(86) PCT No.: PCT/US2021/021510

§ 371 (c)(1),
(2) Date: Sep. 9, 2022

(87) PCT Pub. No.: WO2021/183515

PCT Pub. Date: Sep. 16, 2021

(65) Prior Publication Data

US 2023/0109656 A1      Apr. 6, 2023

Related U.S. Application Data

(60) Provisional application No. 62/987,461, filed on Mar. 10, 2020.

(51) Int. Cl.

| | |
|---|---|
| *C05B 13/06* | (2006.01) |
| *A01N 25/26* | (2006.01) |
| *B01D 53/62* | (2006.01) |
| *B01J 20/20* | (2006.01) |
| *B01J 20/24* | (2006.01) |
| *B01J 20/28* | (2006.01) |
| *B01J 20/30* | (2006.01) |
| *B01J 20/32* | (2006.01) |
| *B01J 20/34* | (2006.01) |
| *C01F 7/025* | (2022.01) |
| *C05B 1/00* | (2006.01) |
| *C05B 3/00* | (2006.01) |
| *C05G 5/12* | (2020.01) |

(52) U.S. Cl.
CPC ............. *C05B 13/06* (2013.01); *A01N 25/26* (2013.01); *B01D 53/62* (2013.01); *B01J 20/20* (2013.01); *B01J 20/24* (2013.01); *B01J 20/2803* (2013.01); *B01J 20/28042* (2013.01); *B01J 20/3042* (2013.01); *B01J 20/3204* (2013.01); *B01J 20/3242* (2013.01); *B01J 20/3416* (2013.01); *B01J 20/3483* (2013.01); *C01F 7/025* (2013.01); *C05B 1/00* (2013.01); *C05B 3/00* (2013.01); *C05G 5/12* (2020.02)

(58) Field of Classification Search
CPC .. B01J 20/20; B01J 20/2803; B01J 20/28042; B01J 20/24; B01J 20/3416; B01J 20/3483; B01D 53/62; B01D 53/82; C05B 1/00; C05B 3/00; C05B 13/06; C05G 5/12; A01N 25/26; C01F 7/025
See application file for complete search history.

(56) References Cited

U.S. PATENT DOCUMENTS

| | | | | |
|---|---|---|---|---|
| 2,976,119 | A | * | 3/1961 | Manning ................... C05B 3/00 |
| | | | | 423/166 |
| 3,954,942 | A | * | 5/1976 | Achorn ..................... C05B 7/00 |
| | | | | 423/313 |
| 4,493,725 | A | | 1/1985 | Moon et al. |

(Continued)

FOREIGN PATENT DOCUMENTS

| | | |
|---|---|---|
| CN | 108727002 A | 11/2018 |
| CN | 110395972 A | 11/2019 |

(Continued)

OTHER PUBLICATIONS

Brattebo et al. "Phorphorous removal by granular activated alumina," Wat. Res., Pergamon Journals Ltd., 1986, p. 977-986, vol. 20 No. 8.
Choi et al. "The Removal of Fluoride From Waters by Adsorption," Journal (American Water Works Associations), Oct. 1979, p. 562-570, vol. 71 No. 10.
Coltman et al. "A Sand Culture System for Simulating Plant Responses to Phosphorus in Soil," J. Amer. Soc. Hort. Sci., 1982, p. 938-942, 107(5).

(Continued)

*Primary Examiner* — Wayne A Langel
(74) *Attorney, Agent, or Firm* — McNees Wallace & Nurick LLC

(57) ABSTRACT

Agglomerated dispersible granules are disclosed including activated alumina particles and phosphate particles. The activated alumina particles have a porous structure and a plurality of electrically-charged binding sites disposed within the porous structure. The activated alumina particles and the phosphate particles are present in the agglomerated dispersible granules as distinct phases agglomerated together. A method for amending soil with buffered phosphorus is disclosed including physically blending and then agglomerating activated alumina particles with phosphate particles to form the agglomerated dispersible granules. The agglomerated dispersible granules are applied to soil with the activated alumina particles and the phosphate particles being present as distinct phases and the activated alumina particles being free of phosphate disposed within the porous structure. An activated alumina suspension is disclosed including activated alumina particles suspended as a dispersed phase in a continuous phase, the activated alumina particles having a particle size less than 200 μm.

22 Claims, No Drawings

(56) References Cited

U.S. PATENT DOCUMENTS

| | | | | |
|---|---|---|---|---|
| 4,601,891 | A | * | 7/1986 | McGill ................. C01B 25/405 |
| | | | | 71/34 |
| 5,693,119 | A | | 12/1997 | Lynch et al. |
| 6,287,357 | B1 | | 9/2001 | Lynch et al. |
| 7,485,171 | B2 | | 2/2009 | Lynch et al. |
| 9,919,979 | B2 | | 3/2018 | Chen |
| 10,508,061 | B2 | | 12/2019 | Bunderson |
| 10,513,470 | B2 | * | 12/2019 | Clark ........................ C05B 7/00 |
| 11,807,587 | B2 | * | 11/2023 | McLaughlin ........... C05B 17/00 |
| 2009/0016954 | A1 | * | 1/2009 | Robson ................. C04B 35/626 |
| | | | | 423/625 |
| 2015/0152017 | A1 | * | 6/2015 | Schumski ................ C05C 3/00 |
| | | | | 71/24 |

FOREIGN PATENT DOCUMENTS

| | | | | | |
|---|---|---|---|---|---|
| DE | 2826095 | A1 | | 12/1979 | |
| EA | 007027 | B1 | | 6/2006 | |
| GB | 1598743 | | * | 9/1981 | ............... C01F 7/02 |
| IL | 117963 | A | | 4/2001 | |
| JP | 3388966 | B | * | 3/2003 | ............... C02F 1/28 |
| JP | 2007524500 | A | | 8/2007 | |
| WO | 2001021553 | A1 | | 3/2001 | |
| WO | 2001045838 | A1 | | 6/2001 | |
| WO | 2003064350 | A1 | | 8/2003 | |
| WO | 2019191050 | A1 | | 10/2019 | |

OTHER PUBLICATIONS

Elliott et al., "A Perspective on Agroecosystem Science," Ecology, Dec. 1989, p. 1597-1602, vol. 70 No. 6.

Hensel, Julius, "Bread From Stones: A New and Rational System of Land Fertilization and Physical Regeneration," Soil and Health Library, Tri-State Press, Long Creek, SC, US, 1894, scan dated Jul. 2009.

Zuyi et al. "On the Applicability of the Langmuir Equation to Estimation of Adsorption Equilibrium Constants on a Powdered Solid from Aqueous Solution," Journal of Colloid and Interface Science, www.idealibrary.com, 2000, p. 8-12, 231.

PCT Notification of Transmittal of the International Search Report and the Written Opinion of the International Searching Authority, or the Declaration issued to counterpart Application No. PCT/US2021/021510 dated Jun. 7, 2021.

Belekar et al. "Activated Alumina Granules with nanoscale porosity for water defluoridation," Nano-Structures & Nano-Objects, Elsevier, 2018, p. 322-328, 16.

Roy et al. "Phosphate adsorption on y-alumina: a surface complex model based on surface characterization and zeta potential measurements," Journal of Physical Chemistry C, American Chemical Society, HAL Open Science, 2021, p. 10909-10918, 125(20).

Wan et al. "Polyphosphate Adsorption and Hydrolysis on Aluminum Oxides," Environmental Science & Technology, 2019, p. 9542-9552, 53.

Yue, Checkman Michael "Removal of phosphate by sorption on activated alumina," Masters Theses, Missouri S&T Library and Learning Resources, 1970, 5472.

Coleman et al. "Interactions in Soil: Promoting Plant Growth—Toward a Holistic Approach to Soils and Plant Growth," South China Botanic Garden, Chinese Academy of Sciences, Guangzhou China.

Elliott, E. T. "Division S-3—Soil Microbiology and Biochemistry: Aggregate Structure and Carbon, Nitrogen, and Phosphorous in Native and Cultivated Soils," Soil Sci. Soc. Am. J., 1986, p. 627-633, 50.

Russian Search Report issued to counterpart Application No. 2022124936 dated Jul. 31, 2023.

* cited by examiner

AGGLOMERATED DISPERSIBLE GRANULES, METHODS FOR AMENDING SOIL, AND ACTIVATED ALUMINA SUSPENSIONS

RELATED APPLICATIONS

This application claims the benefit of and priority to U.S. Prov. App. No. 62/987,461, filed Mar. 10, 2020, entitled "Improved Methods for Making and Applying Buffered Phosphorus," which is hereby incorporated by reference in its entirety.

FIELD OF THE INVENTION

This application is directed to agglomerated dispersible granules, methods for amending soil, and activated alumina suspensions. In particular, this application is directed to agglomerated dispersible granules having alumina particles and phosphate particles present as distinct phases, methods for amending soil with buffered phosphorus in the form of the agglomerated dispersible granules, and activated alumina suspensions wherein the activated alumina particles constitute a dispersed phase suspended in a continuous phase.

BACKGROUND OF THE INVENTION

Phosphorus is a key nutrient for plant growth. Metal oxides, including activated alumina, kaolin, bauxite, iron oxide, calcium oxide, and magnesium oxide, have been used as a buffer to apply phosphorus as a fertilizer. Activated alumina, in particular, has been used in buffered-release activated alumina and phosphorus soil amendments ("BRAAPSA"). Traditionally, BRAAPSA has been made by loading liquid phosphorus (e.g., phosphoric acid) onto activated alumina to create a BRAAPSA which may be physically put into the soil as a soil amendment for plants. Lynch et al. in U.S. Pat. No. 6,287,357 describe a method for forming BRAAPSA, which method is dependent on a phosphorous source being reversibly bound to acid-activated alumina prior to soil application. BRAAPSA has significantly reduced unwanted phosphorus loss due to leaching which is unwanted because phosphorus leaching may cause ground water contamination as well as increasing the amount of phosphorus that needs to be applied to the soil. Additionally, BRAAPSA may positively improve plant growth for various plant species (e.g., by improving root growth, etc.). This is because the buffered-release mechanism of BRAAPSA releases nutrients based on a chemical gradient whereas existing coated fertilizer technologies rely upon environmental conditions and lead to more phosphorus being leached (i.e., lost) into the ground water.

Activating a metal oxide may be done in a variety of ways. Activated alumina adsorbents are often produced by agglomerating and heat processing (i.e., calcining) aluminum trihydrate powder. Spherical alumina is formed, then crushed (e.g., mechanical fracturing), then followed by a screening process to produce granular activated alumina of various sizes (often referred to as mesh sizes due to the size of the mesh sieves used to separate particles based on size). The adsorptive capacity of an activated metal oxide such as activated alumina is determined in large part by the surface area. Because of the porous nature of activated alumina, a majority of the surface area exists in the pore spaces which are produced by the calcination process (i.e., a more porous compound has more surface area than a similarly-sized particle with less porous surface). The capacity for chemiadsorbing orthophosphate is high compared to other plant nutrients such as nitrogen and potassium due to the high anionic exchange capacity of the material, making activated alumina a preferable substrate for buffering the release of phosphate fertilizers. However, a variety of metal oxides may be activated and used in a similar manner.

Although applying to the soil a BRAAPSA soil amendment is somewhat more efficient than conventional methods of applying phosphorus-containing fertilizer directly to the soil (i.e., either directly or via a coated fertilizer), BRAAPSA may be difficult, expensive, and time-consuming to make. The process of loading a granular activated alumina with a liquid source of phosphorus (e.g., phosphoric acid) does have problems. By way of example, liquid phosphorus compounds (e.g., phosphoric acid, orthophosphoric acid, phosphoric (V) acid) are acids which require careful handling and use of personal protective equipment because acids such as phosphoric acid may cause severe irritation of the skin and eyes. Additionally, liquid phosphorus (e.g., phosphoric acid) requires specific equipment to handle because equipment may be degraded from contact with acid. Additionally, activated alumina has insoluble characteristics which can give it limited application opportunities. For example, activated alumina must be physically and/or mechanically incorporated into the soil (e.g., applied to small holes of a certain depth). Physical and/or mechanical application to the soil may prove to be a time-consuming and laborious process for farmers. Additionally, physical and/or mechanical application is not ideal for a variety of fertilizer application opportunities (e.g., hydroponics and no-till plants such as fruit trees and turf). The application process is typically limited to granular activated alumina sized to pass through 8×14, 14×28, or 14×48 mesh. The particle size may provide structural benefits to soil application (e.g., particles that are too small can result in dust which results in loss of product and also can be harmful to humans when inhaled; particles that are too large may have less surface area and may have reduced buffering capacity as well as being more expensive).

In most agriculture uses (e.g., turf, ornamental, and crop) production systems, fertilizer is applied to the surface of the growing medium (e.g., soil) and then watered into the soil profile (e.g., a solid particulate fertilizer is applied to the surface of the soil and when water is applied, the soluble fertilizer goes into the soil). The limitation of applying activated alumina alone or BRAAPSA directly to the surface of the growing medium (e.g., soil) is that it is not efficiently watered in (e.g., because of the solubility and/or particle size). For example, the traditional particle sizes that are able to be pre-loaded with a liquid fertilizer source are too big to be watered into the soil effectively, and activated alumina, without phosphorus, has limited solubility which makes watering in a challenge.

A soil amendment including activated alumina not suffering from the above-described limitations would be desirable.

BRIEF DESCRIPTION OF THE INVENTION

In one exemplary embodiment, agglomerated dispersible granules include activated alumina particles and phosphate particles. The activated alumina particles have a porous structure and a plurality of electrically-charged binding sites disposed within the porous structure. The activated alumina particles and the phosphate particles are present in the agglomerated dispersible granules as distinct phases agglomerated together.

In another exemplary embodiment, a method for amending soil with buffered phosphorus includes physically blending activated alumina particles with phosphate particles and then agglomerating the alumina particles with the phosphate particles to form agglomerated dispersible granules and applying the agglomerated dispersible granules to soil. The activated alumina particles have a porous structure and a plurality of electrically-charged binding sites disposed within the porous structure. The activated alumina particles and the phosphate particles are present in the agglomerated dispersible granules as distinct phases agglomerated together and the activated alumina particles are free of phosphate disposed within the porous structure when applied to the soil.

In another exemplary embodiment, an activated alumina suspension includes activated alumina particles and a continuous phase. The activated alumina particles have a porous structure, a plurality of electrically-charged binding sites disposed within the porous structure, and a particle size measured by largest particle dimension less than 1 The activated alumina particles constitute a dispersed phase suspended in the continuous phase.

DETAILED DESCRIPTION OF THE INVENTION

Disclosed herein are agglomerated dispersible granules having alumina particles and phosphate particles present as distinct phases, methods for amending soil with buffered phosphorus in the form of the agglomerated dispersible granules, and activated alumina suspensions wherein the activated alumina particles constitute a dispersed phase suspended in a continuous phase. In particular, by applying agglomerated dispersible granules having alumina particles and phosphate particles present as distinct phases into soil, and then by applying water to the agglomerated dispersible granules on or in the soil (either by irrigation or by natural precipitation) BRAAPSA may be formed in situ in the soil. The compositions and methods disclosed herein, in comparison to compositions and methods not including one or more of the features disclosed herein, may be applied directly to soil surface of most agricultural uses, such as turf, ornamental, and crop production systems, decrease costs of manufacturing and application, increase BRAAPSA penetration into the soil, decrease runoff and waste, or combinations thereof. It is particularly noteworthy that while previous work, such as disclosed by Lynch et al. in U.S. Pat. No. 6,287,357, describes methods for forming BRAAPSA which require a phosphorous source to be reversibly bound to acid-activated alumina prior to soil application, in the present invention it has been unexpectedly discovered that applying phosphate and activated alumina without binding prior to application yields equivalent or even superior results, and is suitable for buffering additional nutrients beyond phosphorous as well. This method and use of material is much simpler than pre-loading activated alumina prior to soil application. Also, with this method, the amount of activated alumina needed on an area basis (per hectare) is at least 50% less, up to 90% less, or even up to 95% less that the amount of activated alumina needed when pre-loaded with phosphorus with binding.

As used herein, "about" indicates a variance of up to 10% from the value being so modified. All values modified with "about" are also intended to convey the unmodified value as an alternative, so that "about 10 μm," by way of examples, discloses both a range of 9-11 μm as well as specifically 10 μm.

In one embodiment, agglomerated dispersible granules include activated alumina particles and phosphate particles. The activated alumina particles have a porous structure and a plurality of electrically-charged binding sites disposed within the porous structure. The activated alumina particles and the phosphate particles are present in the agglomerated dispersible granules as distinct phases agglomerated together.

The activated alumina particles may be calcined alumina particles or calcined alumina particles which have additionally been acid washed, either prior to or following calcination. Activated alumina particles may be produced from spherical alumina being crushed and screened based on particle distribution ranges. The pore space in the activated alumina particles encompasses a majority of the adsorptive capacity because a large amount of the surface area of an activated alumina particle may be in the pores. The activated alumina particles may have any suitable size. In one embodiment, to maintain adsorptive capacity for phosphate and optimizing the activated alumina particle size for penetrating the soil profile through a surface application, a preferred particle size for activated alumina particles is smaller than about 300 alternatively smaller than about 150 or smaller. Activated alumina particle size alteration includes, but is not limited to, taking a fraction of about 2,400 μm to about 1,200 about 1,200 μm to about 600 μm, about 1,200 μm to about 300 μm, or other common grading sizes, and physically breaking the particles (e.g., milling the product to about 300 μm to about 150 μm, about 150 μm to about 75 μm, or <75 μm through grinding processes). This creates smaller-sized activated alumina particles.

In another embodiment, suitably, by way of example, for a suspension, the activated alumina particles have a particle size less than about 200 μm, alternatively less than about 150 μm, alternatively less than about 100 μm, alternatively less than about 75 μm, alternatively less than about 1 μm, alternatively less than about 1 μm, alternatively less than about 50 μm, alternatively less than about 25 μm, alternatively less than about 10 μm, alternatively less than about 5 μm, alternatively less than about 2 μm, alternatively less than about 1 μm, alternatively less than about 0.75 μm, alternatively less than about 0.5 μm, alternatively less than about 0.25 μm, alternatively less than about 0.1 μm, alternatively less than about 0.05 μm, alternatively less than about 0.01 μm, as measured by largest particle dimension. Applying smaller-sized activated alumina particles directly to the surface of the soil may be challenging because activated alumina has limited solubility and small particle sizes may be dusty. It is noted with respect to suspension of particles, that agitation may be employed to form a temporary suspension with particles which might otherwise be too large to form a stable suspension, and that viscosity of a continuous phase may be increased to further stabilize a suspension and compensate for particle size.

Suitable phosphate particles include, but are not limited to, particles of monoammonium phosphate, diammonium phosphate, monopotassium phosphate, dipotassium phosphate, triple super phosphate, polyphosphate, any other similar dry phosphate, or combinations thereof. In one embodiment, a dry granular phosphate source may be physically broken (i.e., milled or ground) to a size similar to the size/mesh/density of the smaller-sized activated alumina particles to promote homogenous blending.

In one embodiment, the activated alumina particles are essentially free, alternatively free, of phosphate disposed within the porous structure. As used herein, "essentially free" indicates that less than 5% of available pores in the activated alumina particles include phosphate.

The activated alumina particles and the phosphate particles may be homogenously distributed or heterogeneously distributed in the agglomerated dispersible granules.

The agglomerated dispersible granules may have any suitable weight ratio of alumina to phosphate, including but not limited to a weight ratio of 10:1 to 1:10, alternatively 8:1 to 1:8, alternatively 7:1 to 1:7, alternatively 6:1 to 1:6, alternatively 5:1 to 1:5, alternatively 4:1 to 1:4, alternatively 3:1 to 1:3, alternatively 2:1 to 1:2, alternatively 3:1 to 1:1, alternatively 1:1 to 1:3, alternative about 2:1, alternatively about 1:1, alternatively about 1:2, or any sub-range or combination of ranges thereof.

The agglomerated dispersible granules may further include additional nutrient content. The additional nutrient content may be in the form of particles present as distinct phases and agglomerated with the activated alumina particles and the phosphate particles, or as an additional nutrient layer coated onto the agglomerated dispersible granules, or as additional free particles of nutrient intermixed with the agglomerated dispersible granules.

Suitable additional nutrient content includes, but is not limited to, bioavailable species of molybdenum, selenium, zinc, copper, cobalt, iron, nickel, manganese, vanadium, calcium, potassium, sulfur, chlorine, silicon, magnesium, sodium, nitrogen, boron, or combinations thereof. Bioavailable species of the foregoing nutrients include, but are not limited to, $MoO_{2-}$, $SeO_{2-}$, $Zn^{2+}$, $ZnCl^-$, $CuCO_3$, $Co^{2+}$, $Fe^{2+}$, $Fe^{3+}$, $Ni^{2+}$, $NiCl^+$, $Mn^{2+}$, $MnCl^+$, $HVO_4^{2-}$, $Ca^{2+}$, $K+$, $SO_4^{2-}$, $Cl^-$, $SiOH_4$, $Mg^{2+}$, $Nat$, $NH^{4+}$, $NO_3^-$, $H_3BO_3$, and $B_4O_7^{2-}$.

In one embodiment, the activated alumina particles are essentially free, alternatively free, of the at least one nutrient within the porous structure. As used herein, "essentially free" indicates that less than 5% of available pores in the alumina particles include the at least one nutrient.

The agglomerated dispersible granules may further include pesticide content. The pesticide content may be in the form of particles present as distinct phases and agglomerated with the activated alumina particles and the phosphate particles, or as a pesticide layer coated onto the agglomerated dispersible granules, or as additional free particles of pesticide intermixed with the agglomerated dispersible granules. Suitable pesticides include, but are not limited to, herbicides, insecticides, fungicides, nematicides, or combinations thereof. Suitable herbicides include, but are not limited to, sulfonylureas, HPPD-inhibitors, chloroacetamides, PPO-inhibitors, phenylurea, triazines, or combinations thereof. Suitable insecticides include, but are not limited to, organophosphates, carbamides, pyrethrins, neonicotinoids, spinosins, indoxacarb, diamides, or combinations thereof. Suitable fungicides include, but are not limited to, strobilurines, pyrimidines, triazoles, dicarboximides, or combinations thereof. Suitable nematicides include, but are not limited to, avermectin, carbamates, organophosphates, or combinations thereof.

The agglomerated dispersible granules may further include biological additive content. The biological additive content may be in the form of particles present as distinct phases and agglomerated with the activated alumina particles and the phosphate particles, or as a biological additive layer coated onto the agglomerated dispersible granules, or as additional free particles of biological additive intermixed with the agglomerated dispersible granules. Suitable biological additive content incudes, but is not limited to, humics, fulvics, living microbes, microbial metabolites, plant extracts, exogenous plant hormones, or combinations thereof. There are numerous suitable variations of humic or fulvic acid-containing formulations, any materials of which are organic matter derived and contain numerous humic and/or fulvic acid species. Microbes may include, but are not limited to, *Rhodopseudomonas* spp., *Bacillus* spp., *Pseudomonas* spp., *Saccharomyces* spp., *Aspergillus* spp., *Candida* spp., *Streptococcus* spp., *Lactobacillus* spp., or combinations thereof. Plant extracts may include, but are not limited to, phytohormones, quinols, plastoquinones, flavonoids, plant-growth-promoting metabolites, or combinations thereof. Exogenous plant hormones may include, but are not limited to, IDAA, gibberellin, abscisic acid, auxins, jasmonates, brassinosteroids, cytokinins, salicylic acid, or combinations thereof.

The agglomerated dispersible granules may further include mineral particles. The mineral particles may be agglomerated with the activated alumina particles and the phosphate particles or may be additional free particles intermixed with the agglomerated dispersible granules.

The agglomerated dispersible granules may include any suitable additive, such as, but not limited to, water-soluble binders, suspension agents, emulsifying agents, or combinations thereof. In one embodiment, the agglomerated dispersible granules include, by weight, 1-40% water-soluble binder, alternatively 5-35%, alternatively 5-15%, alternatively 10-20%, alternatively 15-25%, alternatively 20-30%, alternatively 25-35%, or any sub-range or combination thereof. Suitable water-soluble binders include, but are not limited to, calcium lignosulfonate, ammonium lignosulfonate, or combinations thereof. Suitable suspension agents include, but are not limited to, polysaccharides, inorganic salts, carbomers, or combinations thereof. Suitable emulsifying agents include, but are not limited to, vegetable derivatives such as acacia, tragacanth, agar, pectin, carrageenan, or lecithin, animal derivatives such as gelatin, lanolin, or cholesterol, semi-synthetic agents such as methylcellulose, or carboxymethylcellulose, synthetics such as benzalkonium chloride, benzethonium chloride, alkali soaps (including sodium or potassium oleate), amine soaps (including triethanolamine stearate), detergents (including sodium lauryl sulfate, sodium dioctyl sulfosuccinate, or sodium docusate), sorbitan esters, polyoxyethylene derivatives of sorbitan esters, glyceryl esters, or combinations thereof.

In one embodiment, the agglomerated dispersible granules include by weight, 10-80% activated alumina particles, 10-80% phosphate particles, and 10-50% water-soluble binder, alternatively 30-40% activated alumina particles, 30-40% phosphate particles, and 20-40% water-soluble binder, alternatively 35% activated alumina particles, 35% phosphate particles, and 30% water-soluble binder. In a further embodiment, the agglomerated dispersible granules include by weight, 10-70% activated alumina particles, 10-70% phosphate particles, and 10-50% water-soluble binder, and up to 20% surfactants and emulsifiers combined, alternatively consist of, by weight, 10-50% activated alumina particles, 10-50% phosphate particles, and 10-50% water-soluble binder, and up to 5% surfactants and emulsifiers combined.

The agglomerated dispersible granules may have any suitable size (as measured by diameter based upon the median within the sample). Suitable sizing for the agglomerated dispersible granules may include, but is not limited to, about 0.4 mm to about 4.0 mm, alternatively about 0.4 mm to about 1.2 mm, alternatively about 0.9 mm to about 1.5 mm, alternatively about 1.2 mm to about 1.8 mm, alternatively about 1.5 mm to about 2.1 mm, alternatively about 1.8 mm to about 2.4 mm, alternatively about 2.1 mm to about 2.7 mm, alternatively about 2.4 mm to about 3.0 mm, alternatively about 2.7 mm to about 3.3 mm, alternatively about 3.0 mm to about 3.6 mm, alternatively about 3.3 mm to about 4.0 mm, alternatively about 0.4 mm, alternatively about 0.5 mm, alternatively about 0.6 mm, alternatively about 0.7 mm, alternatively about 0.8 mm, alternatively about 0.9 mm, alternatively about 1.0 mm, alternatively about 1.1 mm, alternatively about 1.2 mm, alternatively about 1.3 mm, alternatively about 1.4 mm, alternatively about 1.5 mm, alternatively about 1.6 mm, alternatively about 1.7 mm, alternatively about 1.8 mm, alternatively about 1.9 mm, alternatively about 2.0 mm, alternatively about 2.1 mm, alternatively about 2.2 mm, alternatively about 2.3 mm, alternatively about 2.4 mm, alternatively about 2.5 mm, alternatively about 2.6 mm, alternatively about 2.7 mm, alternatively about 2.8 mm, alternatively about 2.9 mm, alternatively about 3.0 mm, alternatively about 3.1 mm, alternatively about 3.2 mm, alternatively about 3.3 mm, alternatively about 3.4 mm, alternatively about 3.5 mm, alternatively about 3.6 mm, alternatively about 3.7 mm, alternatively about 3.8 mm, alternatively about 3.9 mm, alternatively about 4.0 mm, alternatively more than about 4.0 mm, or any sub-range or combination thereof. In one non-limiting example, golf greens may use agglomerated dispersible granules of about 0.5 mm to about 0.8 mm. In another non-limiting example, corn may use agglomerated dispersible granules via a broadcast application of about 2.4 mm. In a third non-limiting example, any crop with a strip-till machine application may use agglomerated dispersible granules of about 1.5 mm. In one embodiment, suitable, for example, for application as a suspension, the agglomerated dispersible granules are micronized, and have a particle size less than about 200 μm, alternatively less than about 150 μm, alternatively less than about 100 μm, alternatively less than about 75 μm, alternatively less than about 1 μm, alternatively less than about 1 μm, alternatively less than about 50 μm, alternatively less than about 25 μm, alternatively less than about 10 μm, alternatively less than about 5 μm, alternatively less than about 2 μm, alternatively less than about 1 μm, alternatively less than about 0.75 μm, alternatively less than about 0.5 μm, alternatively less than about 0.25 μm, alternatively less than about 0.1 μm, alternatively less than about 0.05 μm, alternatively less than about 0.01 μm, as measured by largest particle dimension.

A method for amending soil with buffered phosphorus includes physically blending activated alumina particles (as described above) with phosphate particles, agglomerating the alumina particles with the phosphate particles to form agglomerated dispersible granules, and applying the agglomerated dispersible granules to soil. The activated alumina particles and the phosphate particles are present in the agglomerated dispersible granules as distinct phases agglomerated together. The activated alumina particles may be free or essentially free of phosphate disposed within the porous structure when applied to the soil. As used herein, "essentially free" indicates that less than 5% of available pores in the activated alumina particles include phosphate.

Agglomerating the alumina particles with the phosphate particles to form agglomerated dispersible granules may include any suitable agglomeration method, such as, but not limited to, heat agglomeration, agglomeration using chemical additives (such as pan granulation), compaction agglomeration, or combinations thereof.

The agglomerated dispersible granules may include an increased penetration ability relative to BRAAPSA having the same ratio of activated alumina to phosphate such that a greater amount of the agglomerated dispersible granules would reach the root zone following contact with water than would BRAAPSA being applied in the same manner. Due to this increased penetration, and the ability of the agglomerated dispersible granules to form BRAAPSA in situ upon contact with water, the agglomerated dispersible granules provide a more efficient pathway for buffering phosphate in the root zone than does direct application of BRAAPSA. The ability of the agglomerated dispersible granules to form BRAAPSA in situ may be due to the highly charged particles of activated alumina in the agglomerated dispersible granules successfully competing with the soil to attract the phosphate ions from the agglomerated dispersible granules following contact with water. Additionally, agglomerated dispersible granules may be applied with fertilizers, pesticides, or both, making application more efficient for farmers who may add agglomerated dispersible granules to their traditional fertilizer or pesticide application methods. In this way, agglomerated dispersible granules may penetrate the soil profile where the activated alumina particles remain in the solid-phase state and the phosphate fertilizer source is solubilized and provides buffered phosphorus nutrients to plant roots, which may both improve plant growth and also reduce leaching of phosphorus.

Applying the agglomerated dispersible granules to the soil may include surface scattering the agglomerated dispersible granules on the soil, aerating the soil and disposing the agglomerated dispersible granules into the resulting aeration holes, or tilling the soil with the agglomerated dispersible granules. In one embodiment, the agglomerated dispersible granules are applied to the soil without tilling the soil. Application of the agglomerated dispersible granules without tilling the soil may be particularly suitable for use with turf, fruit trees, vines, perennials, and other plants for which tilling the soil is undesirable.

In one embodiment, wherein the agglomerated dispersible granules are micronized, having a particle size less than about 200 μm, alternatively less than about 150 μm, alternatively less than about 100 μm, alternatively less than about 75 μm, alternatively less than about 1 μm, alternatively less than about 50 μm, alternatively less than about 25 μm, alternatively less than about 10 μm, alternatively less than about 5 alternatively less than about 2 μm, alternatively less than about 1 μm, alternatively less than about 0.75 μm, alternatively less than about 0.5 μm, alternatively less than about 0.25 μm, alternatively less than about 0.1 μm, alternatively less than about 0.05 μm, alternatively less than about 0.01 μm, as measured by largest particle dimension, the agglomerated dispersible granules may be suspended as a dispersed phase in a continuous phase. The continuous phase may be any suitable phase, including, but not limited to, water, a pesticide solution, a fertilizer solution, or combinations thereof. In a further embodiment, wherein the largest particle dimension precludes a stable suspension, the suspension may be agitated prior to or during application of the agglomerated dispersible granules. Application may include spraying the suspension or distributing the suspension through an irrigation system to the soil.

In one embodiment, an activated alumina suspension includes activated alumina particles (as otherwise described above), having a particle size less than about 200 μm, alternatively less than about 150 μm, alternatively less than about 100 μm, alternatively less than about 75 μm, alternatively less than about 1 µm, alternatively less than about 1 µm, alternatively less than about 50 µm, alternatively less than about 25 µm, alternatively less than about 10 µm, alternatively less than about 5 µm, alternatively less than about 2 µm, alternatively less than about 1 µm, alternatively less than about 0.75 µm, alternatively less than about 0.5 µm, alternatively less than about 0.25 µm, alternatively less than about 0.1 µm, alternatively less than about 0.05 µm, alternatively less than about 0.01 µm, as measured by largest particle dimension, distributed as a dispersed phase suspended in a continuous phase. The continuous phase may be any suitable phase, including, but not limited to, water, a pesticide solution, a fertilizer solution, or combinations thereof. The pesticide solution and the fertilizer solution may be aqueous solutions. The continuous phase may include solubilized phosphate or non-solubilized phosphate as a second dispersed phase suspended in the continuous phase. In a further embodiment, wherein the largest particle dimension precludes a stable suspension, the suspension may be agitated prior to or during application of the agglomerated dispersible granules. Application may include spraying the suspension or distributing the suspension through an irrigation system to the soil.

EXAMPLES

Comparative and inventive compositions were tested to study the effects of soil amendment on plant growth (perennial ryegrass). Testing conditions included graded fine 100% sand as the soil (reduced water, low nitrogen, reduced phosphorous) disposed in four inch round pots having 650 g medium per pot with 100 cm$^2$ surface area. 8 replications per treatment were performed. The light source was 200-250 µmol/m$^2$/s with a 16 hour light and 8 hour dark cycle at 28° C. under light and 22° C. under dark. Fertilizer was applied (10-0-32 at rate of 0.1 g per pot; 0.01 g N per pot; TSP 0-45-0 at 0.1 g P$_2$O$_5$ per pot).

Example 4 (comparative): Phosphorus-bound alumina (amount applied to provide 50% phosphorus, equal amount of to 50% phosphorus load (rate) control of Example 2). This comparative embodiment is not suitable for agricultural use due to inconsistent sizing, extremely dusty material, and limitations of agricultural application equipment.

Example 5 (inventive): Agglomerated dispersible granules (amount of alumina applied with added phosphorus to equal 50% phosphorus load (rate) of Example 2).

Example 6 (inventive): Agglomerated dispersible granules (amount of alumina applied with added phosphorus to equal 50% phosphorus load (rate) of Example 2).

Example 7 (comparative): Base material (non-agglomerated alumina with amount of alumina applied with added phosphorus to equal 50% phosphorus load (rate) of Example 2). While effective for testing purposes, this comparative embodiment is not suitable for agricultural use due to inconsistent sizing, extremely dusty material, and limitations of agricultural application equipment.

Example 8 (comparative): Base material (non-agglomerated alumina with amount of alumina applied with added phosphorus to equal 50% phosphorus load (rate) of Example 2). While effective for testing purposes, this comparative embodiment is not suitable for agricultural use due to inconsistent sizing, extremely dusty material, and limitations of agricultural application equipment.

Example 9 (inventive): Base material (about 1,200 µm to about 300 µm with amount of alumina applied with added phosphorus to equal 50% phosphorus load (rate) of Example 2).

Example 10 (inventive): Base material (about 700 µm to about 175 µm with amount of alumina applied with added phosphorus to equal 50% phosphorus load (rate) of Example 2).

Example 11 (inventive): Base material (about 150 µm with amount of alumina applied with added phosphorus to equal 50% phosphorus load (rate) of Example 2).

TABLE 1

| | | | | | | | | |
|---|---|---|---|---|---|---|---|---|
| | | | | | Composition Effects | | | |
| Example | Activated Alumina[1] | Emerge Day 10[2] | Root Mass (g) | Root Mass SE | Root Mass % Increase | Root PUE[3] | Root PUE %[3] | Product efficacy[4] |
| 1 (comparative) | 0 | 39.1 | 0.93 | 0.07 | | 20.6 | | |
| 2 (comparative) | 0 | 39.0 | 0.96 | 0.06 | | 42.6 | | |
| 3 (comparative) | 476 | 39.6 | 1.12 | 0.08 | 16.3 | 32.8 | −23.0 | 2.6 |
| 4 (comparative) | 476 | 41.9 | 1.33 | 0.05 | 38.5 | 39.0 | −8.4 | 3.1 |
| 5 (inventive) | 56 | 41.2 | 1.04 | 0.06 | 8.6 | 46.3 | 8.60 | 20.8 |
| 6 (inventive) | 112 | 42.1 | 1.14 | 0.07 | 18.7 | 50.6 | 18.73 | 11.4 |
| 7 (comparative) | 56 | 39.4 | 1.13 | 0.08 | 17.3 | 50.0 | 17.34 | 22.5 |
| 8 (comparative) | 112 | 38.8 | 1.26 | 0.07 | 31.1 | 55.9 | 31.10 | 12.6 |

[1](kg/ha) Applied.
[2]Number of Plants
[3]Phosphorus Use Efficiency
[4]Material Applied Example 1 (comparative): 0.045 g P$_2$O$_5$/pot (triple super phosphate used as full phosphorus control).

Example 2 (comparative): 0.023 g P$_2$O$_5$/pot (triple super phosphate used as 50% load (rate) phosphorus control).

Example 3 (comparative): Phosphorus-bound alumina (amount applied to provide 100% phosphorus, equal amount of to 100% phosphorus load (rate) control of Example 1). This comparative embodiment is not suitable for agricultural use due to inconsistent sizing, extremely dusty material, and limitations of agricultural application equipment.

There is little variation between Examples 1-8 in number of plants emerging at day 10, or the resulting root mass using phosphorus-bound alumina (Examples 3 and 4), activated (calcined) alumina (Examples 7 and 8) and the inventive examples (Examples 5 and 6). There is, however, a difference in root phosphorus use efficiency and product efficacy per amount applied. For root phosphorus efficiency, while phosphorus-bound alumina increases overall root mass, the root phosphorus use efficiency is lower than for unmodified activated alumina or agglomerated dispersible granules of phosphate and activated alumina. Because alumina is a strong adsorber of phosphorus once activated, either by acid rinsing or by calcination, it was expected that either would increase root mass. It was surprising, however, that using activated alumina without phosphorous would give a better phosphorus use efficiency for the same amount of phosphorus as is delivered through phosphorus-bound alumina.

To achieve the same level of root mass growth by supplying plant phosphorous needs through phosphorus-bound alumina, much more material is needed than using activated alumina alone. 56-112 kg/ha of activated alumina (without being bound to phosphorus) achieves the same results as adding 476 kg/ha of phosphorus-bound alumina.

TABLE 2

| Size Effects: Root Mass % Increase is Relative to Control of 50% Phosphorus Level in Example 2 | | |
|---|---|---|
| Example | Sizes from Larger to Smaller | Root Mass % Increase |
| 9 | ~1,200 μm–~300 μm | 5.2 |
| 10 | ~700 μm–~175 μm | 23.9 |
| 11 | ~150 μm | 24.5 |

Unexpectedly, Examples 9-11 demonstrate agglomerated dispersible granules having same composition, but different activated alumina particle sizes increase the adsorption and ultimate release to plants, as indicated by root mass % increase, of phosphorus. Agglomerated dispersible granules having a maximum about 150 μm activated alumina particle size demonstrated the highest root mass % increase, whereas agglomerated dispersible granules having a size between about 1,200 μm to about 300 μm demonstrated the lowest root mass % increase.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. Agglomerated dispersible granules, comprising:
activated alumina particles having:
   a porous structure; and
   a plurality of electrically-charged binding sites disposed within the porous structure; and
phosphate particles,
   wherein the activated alumina particles and the phosphate particles are present in the agglomerated dispersible granules as distinct phases agglomerated together, and
   wherein the agglomerated dispersible granules have a size, as measured by median diameter, of 0.4 mm to 4.0 mm.

2. The agglomerated dispersible granules of claim 1, further including additional nutrient particles present as distinct phases and agglomerated with the activated alumina particles and the phosphate particles.

3. The agglomerated dispersible granules of claim 2, wherein the additional nutrient particles includes at least one nutrient selected from the group consisting of bioavailable species of molybdenum, selenium, zinc, copper, cobalt, iron, nickel, manganese, vanadium, calcium, potassium, sulfur, chlorine, silicon, magnesium, sodium, nitrogen, boron, and combinations thereof.

4. The agglomerated dispersible granules of claim 3, wherein the activated alumina particles are free of the at least one nutrient within the porous structure.

5. The agglomerated dispersible granules of claim 1, further including biological additive particles present as distinct phases and agglomerated with the activated alumina particles and the phosphate particles.

6. The agglomerated dispersible granules of claim 5, wherein the biological additive particles include at least one additive selected from the group consisting of humics, fulvics, living microbes, microbial metabolites, plant extracts, exogenous plant hormones, and combinations thereof.

7. The agglomerated dispersible granules of claim 1, wherein the activated alumina particles are free of phosphate disposed within the porous structure.

8. The agglomerated dispersible granules of claim 1, wherein the activated alumina particles and the phosphate particles are homogenously distributed in the agglomerated dispersible granules.

9. The agglomerated dispersible granules of claim 1, having a weight ratio of alumina to phosphate of 10:1 to 1:10.

10. The agglomerated dispersible granules of claim 1, wherein the agglomerated dispersible granules are coated with an additional nutrient layer, the additional nutrient layer including at least one nutrient selected from the group consisting of bioavailable species of molybdenum, selenium, zinc, copper, cobalt, iron, nickel, manganese, vanadium, calcium, potassium, sulfur, chlorine, silicon, magnesium, sodium, nitrogen, boron, and combinations thereof.

11. The agglomerated dispersible granules of claim 1, further including pesticide particles present as distinct phases and agglomerated with the activated alumina particles and the phosphate particles.

12. The agglomerated dispersible granules of claim 1, wherein the agglomerated dispersible granules are coated with a pesticide layer.

13. The agglomerated dispersible granules of claim 1, wherein the agglomerated dispersible granules are coated with a biological additive layer, the biological additive layer including at least one additive selected from the group consisting of humics, fulvics, living microbes, microbial metabolites, plant extracts, exogenous plant hormones, and combinations thereof.

14. The agglomerated dispersible granules of claim 1, further including at least one of a water-soluble binder, a suspension agent, or an emulsifying agent.

15. The agglomerated dispersible granules of claim 1, wherein the activated alumina particles are less than 200 μm in size as measured by largest particle dimension.

16. An activated alumina suspension, comprising:
activated alumina particles having:
   a porous structure;
   a plurality of electrically-charged binding sites disposed within the porous structure; and
   a particle size measured by largest particle dimension less than 200 μm; and
a continuous phase,
   wherein the activated alumina particles constitute a dispersed phase suspended in the continuous phase.

17. The activated alumina suspension of claim 16, wherein the continuous phase is selected from the group consisting of water, a pesticide solution, a fertilizer solution, or combinations thereof.

18. The activated alumina suspension of claim 16, wherein the continuous phase includes solubilized phosphate or non-solubilized phosphate as a second dispersed phase suspended in the continuous phase.

19. A method for amending soil with buffered phosphorus, comprising:
  physically blending activated alumina particles with phosphate particles, the activated alumina particles having:
    a porous structure; and
    a plurality of electrically-charged binding sites disposed within the porous structure; and then
  agglomerating the alumina particles with the phosphate particles to form agglomerated dispersible granules; and
  applying the agglomerated dispersible granules to soil,
  wherein the activated alumina particles and the phosphate particles are present in the agglomerated dispersible granules as distinct phases agglomerated together and the activated alumina particles are free of phosphate disposed within the porous structure when applied to the soil.

20. The method of claim 19, wherein the agglomerated dispersible granules are applied to the soil without tilling the soil.

21. Agglomerated dispersible granules, comprising:
  10-80%, by weight, activated alumina particles having:
    a porous structure; and
    a plurality of electrically-charged binding sites disposed within the porous structure;
  10-80%, by weight, phosphate particles; and
  10-50%, by weight, water-soluble binder,
  wherein the activated alumina particles and the phosphate particles are present in the agglomerated dispersible granules as distinct phases agglomerated together.

22. Agglomerated dispersible granules, comprising:
activated alumina particles having:
  a porous structure; and
  a plurality of electrically-charged binding sites disposed within the porous structure; and
phosphate particles,
wherein the activated alumina particles and the phosphate particles are present in the agglomerated dispersible granules as distinct phases agglomerated together, and
wherein:
  the agglomerated dispersible granules are coated with:
    an additional nutrient layer, the additional nutrient layer including at least one nutrient selected from the group consisting of bioavailable species of molybdenum, selenium, zinc, copper, cobalt, iron, nickel, manganese, vanadium, calcium, potassium, sulfur, chlorine, silicon, magnesium, sodium, nitrogen, boron, and combinations thereof; or
    a pesticide layer; or
    a biological additive layer, the biological additive layer including at least one additive selected from the group consisting of humics, fulvics, living microbes, microbial metabolites, plant extracts, exogenous plant hormones, and combinations thereof, or
    combinations thereof, or
  the agglomerated dispersible granules further include biological additive particles present as distinct phases and agglomerated with the activated alumina particles and the phosphate particles wherein the biological additive particles include at least one additive selected from the group consisting of humics, fulvics, living microbes, microbial metabolites, plant extracts, exogenous plant hormones, and combinations thereof; or
  combinations thereof.

* * * * *